United States Patent [19]
Mercer

[11] 4,029,006
[45] June 14, 1977

[54] METHOD AND APPARATUS FOR PRINTING INDICIA ON A CONTINUOUS, ELONGATE, FLEXIBLE THREE-DIMENSIONAL MEMBER

[75] Inventor: Paul W. Mercer, Redmond, Wash.

[73] Assignee: The Boeing Company, Seattle, Wash.

[22] Filed: June 26, 1975

[21] Appl. No.: 590,462

[52] U.S. Cl. .................................. 101/35; 197/1 R; 346/75; 346/1; 118/624; 118/630; 118/7; 118/DIG. 21

[51] Int. Cl.² ......................................... B41F 17/00

[58] Field of Search ............... 101/35, 426, DIG. 3, 101/DIG. 13, 1 R; 197/1 R; 118/DIG. 20, DIG. 21, DIG. 22, 623–625, 629–631, 7, 8, 401; 346/1, 75; 427/178

[56] References Cited

UNITED STATES PATENTS

| | | | |
|---|---|---|---|
| 2,562,500 | 7/1951 | Lunt et al. ........................ | 118/401 |
| 2,723,215 | 11/1955 | Biefeld et al. ............... | 118/DIG. 20 |
| 2,778,763 | 1/1957 | Novak ...................... | 118/DIG. 20 |
| 2,989,943 | 6/1961 | Fitzgerald et al. .......... | 118/DIG. 21 |
| 3,071,486 | 1/1963 | Kingsley ..................... | 118/DIG. 22 |
| 3,173,806 | 3/1965 | Dodge ........................ | 118/DIG. 21 |
| 3,263,127 | 7/1966 | Point et al. .................. | 118/631 X |
| 3,560,641 | 2/1971 | Taylor et al. ................. | 346/75 X |
| 3,590,778 | 7/1971 | Mozzi, Jr. ...................... | 118/8 |
| 3,596,275 | 7/1971 | Sweet ........................... | 346/75 |
| 3,606,162 | 9/1971 | Lehmann ..................... | 118/7 X |
| 3,638,612 | 2/1972 | Haise et al. ..................... | 346/75 |
| 3,689,693 | 9/1972 | Cahill et al. .................... | 346/75 X |
| 3,702,404 | 11/1972 | McDermitt ..................... | 118/8 |
| 3,731,655 | 5/1973 | Griesser ..................... | 118/DIG. 21 |
| 3,739,395 | 6/1973 | King ............................ | 346/75 |
| 3,797,022 | 3/1974 | Beam et al. .................... | 346/75 |
| 3,803,628 | 4/1974 | Van Brimer et al. ............. | 346/1 |
| 3,813,676 | 5/1974 | Wolfe ........................... | 346/75 |
| 3,852,772 | 12/1974 | Hecht et al. .................. | 346/75 |
| 3,903,840 | 9/1975 | Gemelli ................... | 118/DIG. 21 X |
| 3,908,542 | 9/1975 | Andersson ..................... | 118/8 X |

FOREIGN PATENTS OR APPLICATIONS

| | | | |
|---|---|---|---|
| 1,118,844 | 12/1961 | Germany .................... | 118/DIG. 21 |
| 1,134,129 | 10/1959 | Germany .................... | 118/DIG. 21 |
| 1,034,146 | 6/1966 | United Kingdom ........ | 118/DIG. 21 |

*Primary Examiner*—E. H. Eickholt
*Attorney, Agent, or Firm*—Christensen, O'Connor, Garrison & Havelka

[57] ABSTRACT

Electrical wires and other continuous, elongate, flexible members having a three-dimensional exterior printing surface are marked with alpha-numeric characters by longitudinally feeding the wire past an electronically controlled ink jet printing head assembly that forms the characters by directing a positionable jet of ink onto the exterior surface of the wire. A wire feed transport receives the electrical wire from a storage reel and longitudinally feeds it through aligned guides establishing a wire guide path. The guide path carries the wire past a printing station at which the printing head assembly ejects a jet of electrostatically charged ink drops which are selectively deflected in a dimension transverse to the wire and in synchronism with the rate of longitudinal travel of the wire as established by the transport so that the ink drops impinge on the exterior three-dimensional wire surface in patterns which form the desired characters. The printing head assembly and wire guide are adjustably mounted for achieving precise registration between the ink jet and wire surface. Control means including a drive for the transport, a wire travel encoder, a printing head control unit, a data input terminal and an interface circuit cooperate to receive predetermined alpha-numeric indicia and to automatically operate the transport and ink jet printing head assembly to repetitively mark the wire with an identifying, multi-character code, wherein the code is repeated at selected, longitudinally spaced intervals along the wire. After being marked, the wire is automatically coiled in a coiling pan disposed at the discharge end of the wire guide path.

20 Claims, 5 Drawing Figures

Fig. 5.

METHOD AND APPARATUS FOR PRINTING INDICIA ON A CONTINUOUS, ELONGATE, FLEXIBLE THREE-DIMENSIONAL MEMBER

BACKGROUND OF THE INVENTION

The present invention relates to method and apparatus for printing indicia, such as alpha-numeric characters, on an exterior three-dimensional surface of a continuous, elongate, flexible member, such as an electrically insulated wire that is to be marked for identification.

In the manufacture and servicing of multi-wire electrical systems, it is useful and may times necessary to mark the wires with identifying alpha-numeric codes or other indicia. For example, the electrical control systems for a commercial aircraft utilize thousands of control wires which are strung throughout the aircraft frame. Usually, the wires are grouped to form a wire harness wherein the wires are measured and cut to predetermined length, and routed to fit between the plugs, connectors and other terminals pre-established for each harness. The harness is thereafter installed in the aircraft.

In the manufacture and installation of these wire harnesses and subsequently during servicing the aircraft's electrical system, it is necessary to be able to identify and distinguish each wire from the numerous adjacent wires in the same or similar harness. Because of the large number of wires, mere color coding of the insulating sheaths is not satisfactory, and it has become necessary to resort to lengthy, multiple character alpha-numeric codes to uniquely identify each wire and group of wires.

Heretofore, these alpha-numeric identification codes have been either stamped directly onto the insulating sheaths of the wires or applied indirectly by placing printed tape or sleeve tags on the wires at spaced intervals therealong. Of these processes, hot-stamp marking and cold ink type wheel marking techniques have been preferred. In hot-stamp marking, each of the wires to be marked are transported into a printing position, stopped and momentarily held stationary while a heated alpha-numeric type face is pressed into engagement with the exterior insulating sheath of the wire. The type is either pre-inked or an ink ribbon is interposed between the type and the wire sheath, causing the ink on the ribbon to be transferred to the sheath in a process which has sometimes been called "branding" of the wire. After each branding or printing operation, the wire is advanced by a predetermined longitudinal interval, whereupon the operation is repeated. This technique involves a number of disadvantages. The start-stop, intermittent advancement of the wire, significantly limits the overall operating speed of the process. Furthermore, substantial labor cost is required in operating the machines and in changing the alpha-numeric code type, each time a new batch of wire is processed.

Moreover, it has been found that the heated, printing type, when pressed into contact with the wire insulation pursuant to the branding operation, causes significant deformation of the insulation, sometimes damaging it beyond acceptable specifications. In other cases, the branding results in an intolerable change in the effective dielectric of the insulation. This degradation of the insulation and the change in the dielectric thereof, is particularly troublesome in the case of wires having thin wall insulation. The thinness of such wire sheaths is incapable of accommodating any significant penetration of the heated type, thus limiting the application of this type of marking process.

In cold ink, type wheel printing, the type is disposed about an outer circumferential rim of the wheel and is rotated with such rim in engagement with the wire to transfer the printing ink thereto. Thermal curing of the transferred ink is thereafter required. Practical limits on the wheel rotation speed, inflexibility of the wheel code fixed by the type, and labor costs in changing type wheels and other limitations have been encountered in utilizing this technique.

Because hot-stamp, type wheel and other automatic contact printing processes require a relatively uniform printing surface, they are incapable of satisfactorily printing code numbers on wire surfaces that are irregular, such as exhibited by twisted or straight stranded, braided, and coax wires. With wires of this type, the exterior surface is too irregular to be printed by type and it is necessary to resort to slower, more costly techniques, such as manual application of preprinted tags.

Since contact printing systems, such as the hot-stamp technique, typically involve the use of alpha-numeric type, there ia usually a certain maximum number of characters, e.g. 18 to 25, available for forming a particular identification code. This, of course, limits flexibility in the amount and kind of the wire identification data that can be printed onto the wire. These foregoing disadvantages, present restrictions on the efficiency and reliability of existing marking systems.

SUMMARY OF THE PREFERRED EMBODIMENT OF THE INVENTION AND ITS OBJECTIVES

Accordingly, it is an object of the present invention to provide an improved method and apparatus for printing indicia, such as alpha-numeric characters, on a continuous, elongate, flexible three-dimensional member in which the foregoing disadvantages encountered in existing printing systems are overcome or ameliorated. For example, such a member may be an electrical wire, either uninsulated or having an exterior dielectric sheath, or the member may be sleeving adapted to be slipped over one or more such wires.

Another object of the present invention is to provide an improved method and apparatus for printing alpha-numeric characters on the outer surface of continuous elongate electrical wire, especially but not necessarily insulated wire, for identification purposes, which are capable of relatively high speed and reliable printing; do not damage or significantly change the dielectric of the wire insulation; are capable of effectively printing on irregular three-dimensional surfaces such as presented by the composite convolutions of twisted wires; are versatile in the make-up of the code and number of characters which may be printed; and wherein the apparatus is relatively simple to operate.

These objects are achieved by a method and apparatus which briefly, includes a transport means operated by a control means to longitudinally feed the wire or other member in a guide path which extends past an ink jet printing station. The printing station includes an ink jet printing head assembly disposed laterally adjacent the guide path for directing a jet of printing ink toward the three-dimensional exterior surface of the wire.

The control means for the system, in addition to operating the transport means, is also coupled to the printing head assembly for controlling the deflection of the ink jet in accordance with predetermined electronic data and in synchronization with the rate of continuous advancement of the wire past the printing station. The indicia, which may take the form of alpha-numeric characters, is printed upon the wire surface by a combination of the selective, electrostatic deflection of a series of ink drops forming the ink jet and the simultaneous longitudinal advancement of the wire past the printing head assembly. Because the ink jet printing operation is a non-contact process, in which the ink drops are projected, in flight toward the wire, the characters are effectively and reliably printed notwithstanding irregularities in the exterior surface thereof, such as exhibited by the convolutions of twisted pairs and twisted multiple conductors, and the circumferential non-uniformity of straight stranded conductors.

Further in accordance with one embodiment of the method and apparatus of the present invention, electrical wires, intended for use in a multi-wire harness or cable, are automatically marked with a mult-character alpha-numeric code at repetitive, longitudinally spaced intervals along the exterior thereof. The unmarked wire, which may include one or more insulated or uninsulated conductors, is dereeled from a supply spool and fed into a caterpillar-like flexible belt wire transport of the type disclosed and claimed in U.S. patent application Ser. No. 502,297 filed Sept. 3, 1974 by Donald R. Park and Gerald G. Blevins for WIRE MEASURING APPARATUS, now abandoned. The system control means issues a drive command signal for operating the transport to advance the unmarked wire longitudinally through wire guide means which transversely guide the wire past the ink jet printing station. A workpiece travel encoder is coupled to the transport for developing an electrical signal representing the rate of travel of the wire, wherein this rate of travel signal is fed to the control means for synchronizing the operation of the ink jet printing head. The predetermined alpha-numeric code, which may be introduced into the system via a data input means, is thereupon printed onto the exterior three-dimensional surface of the wire as it passes the printing station.

To provide an effective identification of the wire, the unique alpha-numeric code is automatically, repetitively printed onto the wire at predetermined longitudinally spaced intervals. Once the alpha-numeric code has been selected and entered into the data terminal, this same code data is effective to operate the printing head assembly to reproduce the same sequence of code characters at the appropriate longitudinally spaced positions on the wire. To adjust for different size wires, quickly interchangeable wire guides are provided, and the guides and the ink jet head assembly are mounted on separate, adjustable carriage means, to position the head assembly at a proper distance from the wire to produce alpha-numeric characters having a size commensurated with that of the wire width, and to adjustably position the wire guide path in registration with the scan of the ink jet. An electrically triggered cut-off device located between the transport and the ink jet printing station, is operated by the control system in response to wire length data introduced into the system through the same input data terminal that accepts the alpha-numeric code characters. Thus a predetermined wire length, associated with the predetermined alpha-numeric code, may be selected, with the system automatically marking and thereafter cutting the wire to the desired length, measured by totalizing the longitudinal rate signals received from the travel encoder coupled to the wire transport.

These and further features, objects and advantages of the method and apparatus in accordance with the present invention will become apparent to those skilled in the art from a consideration of the following detailed description and appended drawings of a particular exemplary embodiment thereof.

DESCRIPTION OF THE PREFERRED EMBODIMENT OF THE INVENTION

Figure 1:
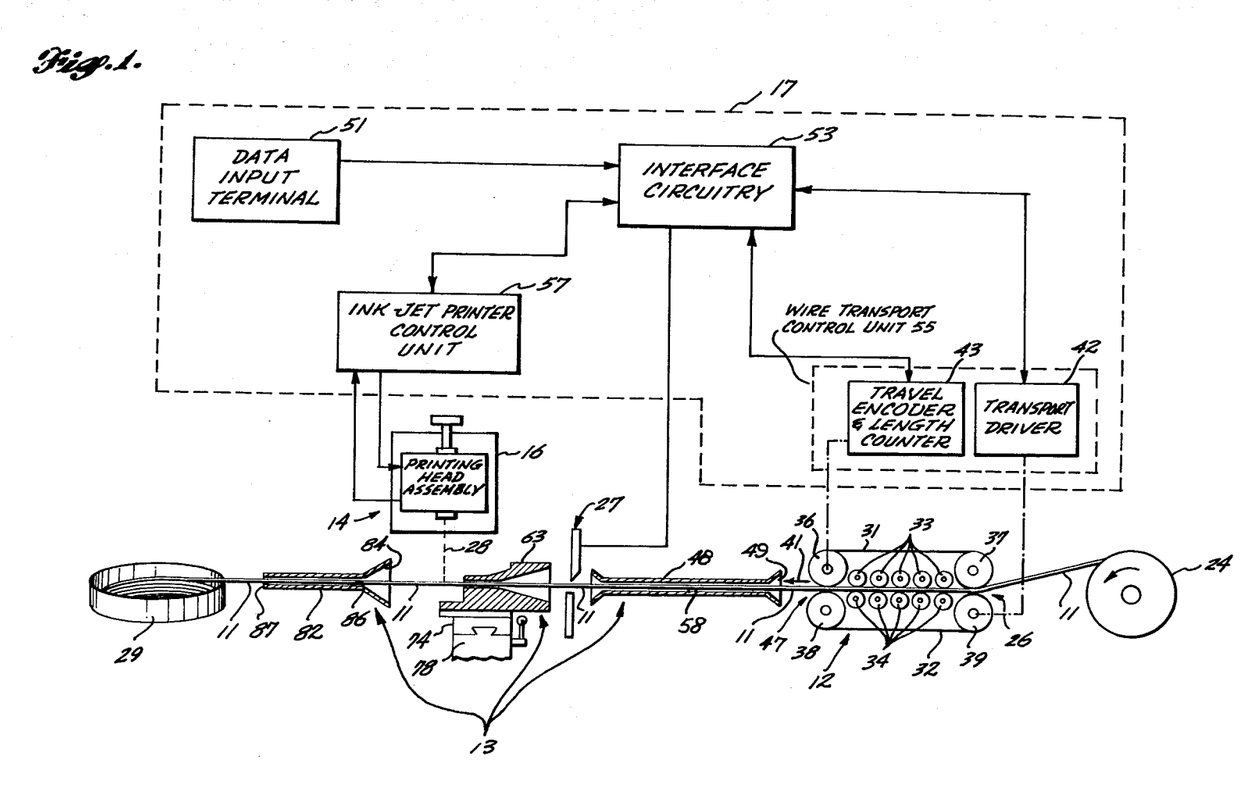
FIG. 1 is a diagrammatic showing of the apparatus for printing indicia on a continuous elongate flexible three-dimensional member, such as an electrical wire, constructed in accordance with the present invention.

With reference to FIG. 1, a system is provided for marking identification codes on a continuous, elongate, flexible, three-dimensional member, such as an electrical wire, or a sleeving adapted to be slipped over one or more electrical wires. Illustrated here, a wire 11, is provided in which the wire is received by a wire transport 12 and is longitudinally advanced thereby through a series of aligned wire guides 13 which establish a wire guide path coincident with the elongated dimension of the wire and which extends past an electrostatic ink jet printing station 14 equipped with an ink jet printing head assembly 16. A control means 17, including a data input terminal 51, an ink jet printer control unit 57, a wire transport control unit 55 and interface circuitry 53, serves to control transport 12 and printing head assembly 16 in accordance with a predetermined wire marking sequence.

Wire 11 may be any of a wide variety of single or multiple electrical conductors including insulated or uninsulated, single, multiple, twisted, straight stranded, jacketed, shielded, braided, coax or cable conductors. As indicated hereinabove, the marking of such wires with identifying alpha-numeric codes or other indicia is desirable in fabricating, installing and servicing electrical control systems. Typically, the wires must be measured, marked with the proper code and cut to a predetermined length to fit between pre-established locations for plugs and connectors at the terminal ends of a multi-wire harness. The method and apparatus of the system shown in FIG. 1 carries out these marking, measuring and cutting operations at heretofore unobtainable speed and reliablility.

Moreover, the printing or marking of a multi-character alpha-numeric code is effectively applied to wires having an irregular exterior printing surface. For example, in FIG. 2, an exemplary multi-character identification code is printed onto the exterior, composite convolutions of a twisted pair of sheathed conductors 23, a result which cannot be satisfactorily achieved using the heretofore preferred hot-stamping technique as discussed above.

Although the continuous, elongate flexible member is here shown as wire 11, a wire sleeving in the form of an elongate tubular dielectric may be printed by the method and apparatus of the present invention. Such sleeving may be adapted for being slipped over one or more wires for providing additional insulation around one or more individually insulated wires, or for serving as a protective jacket against abrasion of the wires, or as a printed sleeve for identifying the associated wire or wires.

The unmarked wire 11 may be dereeled from a bulk storage spool 24 rotatably mounted in position adjacent an entry end 26 of transport 12 so that a leading end of the wire may be threaded into transport 12 and thereafter advanced under the control of wire transport control unit 55 of the control means 17. Downstream of transport 12, wire 11 is forwarded by guides 13 in a guide path extending past cut-off device 27 which is operated under the control of transport control unit 55 of control means 17, and from there past the printing station 14 where the exterior surface of the wire is printed by a selectively deflected jet 28 of ink drops.

Preferably and for the embodiment of the invention disclosed herein, the control means 17 provides for repetitively printing the same multi-character code on the wire at longitudinally spaced intervals so that the wire is identifiable along its entire length.

After being printed, the wire is fed downstream of station 14 and automatically coiled, in this instance by a circular, relatively shallow horizontally disposed coiling pan mounted for free rotation about its axis of symmetry. The marked wire may be measured and cut to a desired length by operating cut-off device 27, positioned between transport 12 and printing station 14 after a predetermined amount of travel of the wire has been monitored by wire transport control unit 55. In the particular embodiment of the invention disclosed herein, when a preset length of wire has been fed by transport 12 past printing station 14, wire transport control unit 55 and interface electronics 53, control means 17 of the system automatically terminate the operation of transport 12, substantially simultaneously terminate the operation of printing head assembly 16, and actuate cut-off device 27 to sever the wire and thus complete the processing thereof.

Figure 2:
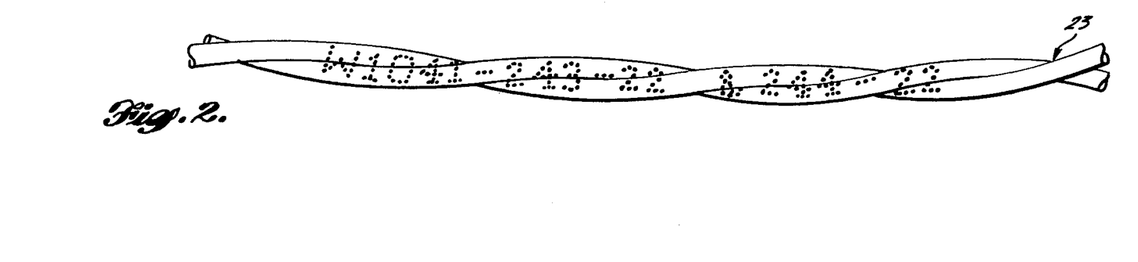
FIG. 2 is a plan view of a wire formed by a twisted pair of insulated electrical conductors printed as a unit with an identifying alpha-numeric code by the method and apparatus of the present invention as shown in FIG. 1.
Figure 3:
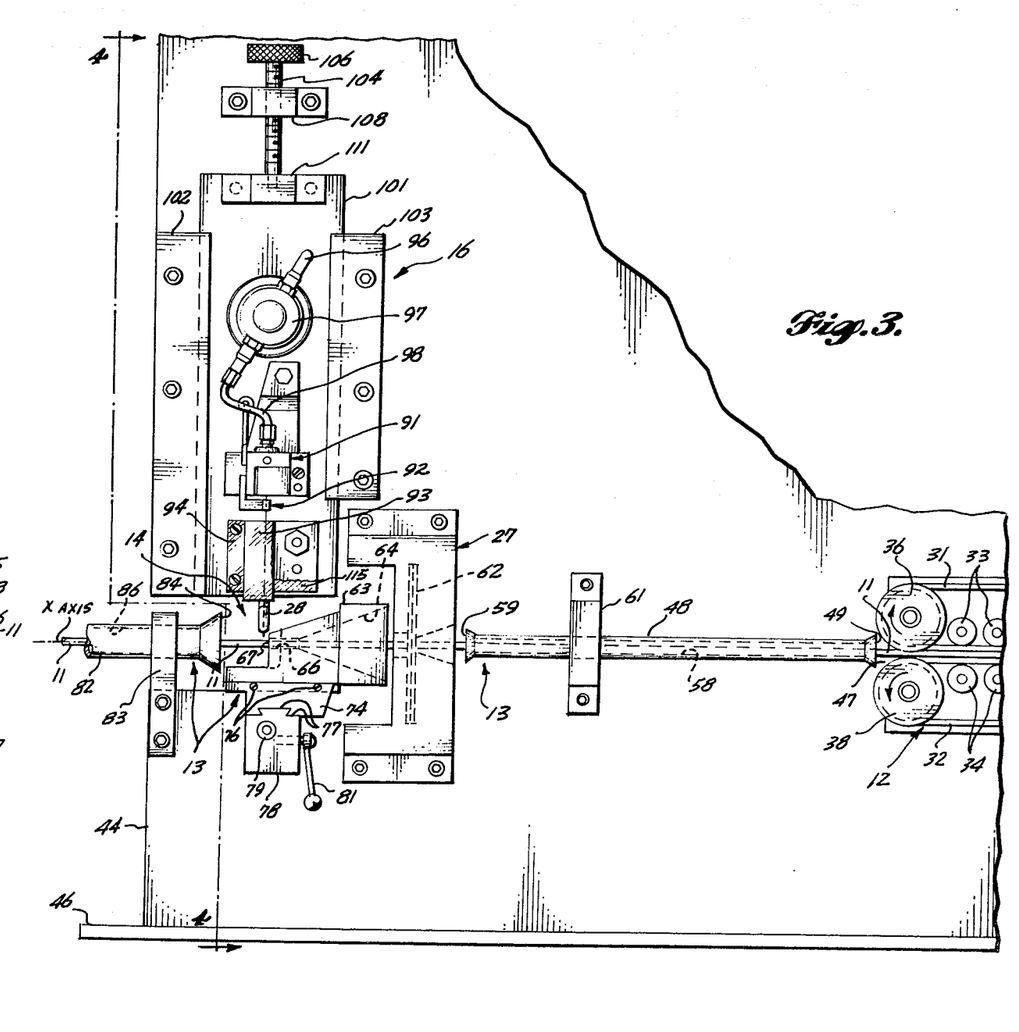
FIG. 3 is a fragmentary plan view of the ink jet printing head assembly, wire guides, wire cut-off device, and wire transport components of the apparatus shown in FIG. 1.
Figure 4:
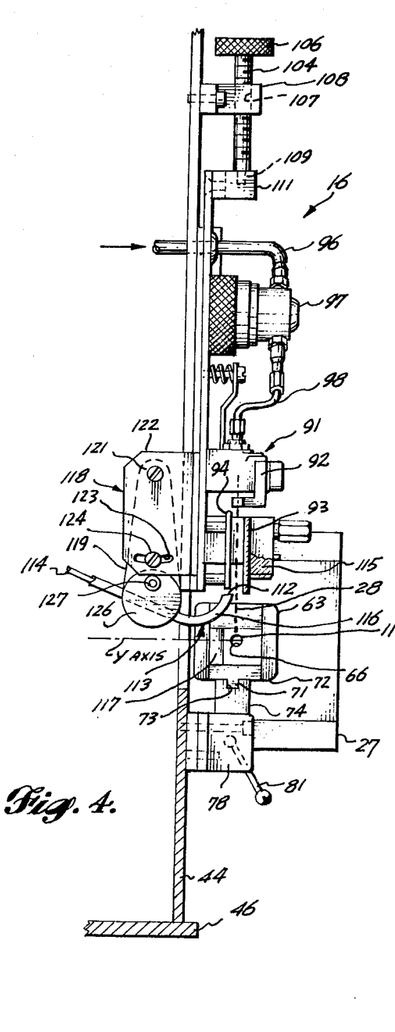
FIG. 4 is a plan view of the components of FIG. 3 as viewed from the direction indicating arrows 4—4 of the FIG. 3.

With reference to FIGS. 1, 3 and 4, the wire transport 12 may be of the type disclosed in the aforementioned U.S. patent application Ser. No. 502,297 in which upper and lower flexible drive belts 31 and 32 respectively are each trained about drive and idler wheels 36, 37, 38 and 39. First and second sets of bogeys 33 and 34 are mounted on generally parallel axes between each of the opposed sets of belt wheels 36, 37, 38 and 39 engaging inner teethed surface portions of the belts 31 and 32 to locate outer surface portions of the belts in mutually opposing relationship for receiving and engaging wire 11 therebetween. As disclosed more fully in the aforementioned application Ser. No. 502,279, the first and second sets of bogeys 33 and 34 are both laterally and longitudinally offset from each other with respect to the guide path of wire 11 to cause an automatic lateral centering of the wire as it is frictionally engaged and driven longitudinally in the direction indicated by arrow 41 when a rotational drive is applied to one or more of wheels 36–39. In this instance, belt wheel 39 is rotatably driven by a transport driver 42 of wire transport control unit 55. Although other transport means may be employed for advancing the wire 11 past printing station 14, the particular transport 12 utilized here applies a positive longitudinal feed to the wire, even when feeding wires having irregular exterior profiles such as the twisted pair shown in FIG. 2, and wires having low friction, smooth exterior sheathing.

While transport 12 here provides for advancing the wire by feeding it past the printing station, alternatively a transport means that is mounted downstream of station 14 and pulls the wire therepast, may be employed.

Coacting with transport 12 and forming a part of wire transport control unit 55 is a motion or travel encoder and length counter 43 for developing electrical signals representing the rate and travel distance of the wire as it is advanced by the transport. Driver 42 and encoder and length counter 43 of unit 55 are connected to interface circuitry 53 to provide means for starting and stopping the transport, synchronizing the operation of ink jet control unit 57 to the rate of the wire at it is advanced past printing head assembly 16 and to totalize the length of wire fed by transport 12, in order to operate the cut-off device 27 at the proper wire length.

Transport 12 may be mounted on an upstanding support panel 44, which may form the front panel of a housing (not shown) for containing the components of control means 17 as diagrammatically shown in FIG. 1. With panel 44 supported by a lower horizontal base 46, the transport 12 may be mounted so as to define the commencement of a substantially horizontal guide path for wire 11 starting at entry end 26. Mounted in alignment with the guide path initiated by transport 12 and adjacent an exit and 47 thereof, is the first of a series of wire guides 13. More particularly, a first guide 48, here being of elongate, tubular shape, is mounted by bracket 61 between transport 12 and cut-off device 27, and includes a flared entry end 49, an elongate guide opening 58 and a discharge end 59.

The wire is passed from guide 48 through cut-off device 27, which may be any of a wide variety of electrically triggered devices having a cut-off blade, such as indicated by blade 62, mounted adjacent the guide path and being operable on command to sever the wire is a cut-off plane substantially transverse to length thereof. In this particular embodiment, a pneumatically powdered, eletrically triggered cut-off device is utilized.

Downstream of cut-off device 27, the wire is fed into and through a quick changeable, precision guide block 63 having an enlarged conical inlet opening 64, converging in the direction of wire travel, and a precision discharge guide opening 66 concentrically aligned with opening 64 and serving as a means for transversely guiding the wire adjacent printing station 14. The enlarged conical inlet opening 64 serves to capture and self-guide a leading end of a wire that has been severed by cut-off device 27. The conical guide opening 64 guides the leading end of the wire into the precision guide opening 66 which is dimensioned for each wire size to precisely position the exterior three-dimensional printing surface thereof in registration with the jet 28 of ink drops ejected from printing head assembly 16.

Guide block 63 and more particularly opening 66 thereof serve to position wire 11 along a y axis that extends substantially transversely to the wire guide path, which may be called the x axis, and substantially transversely to the trajectory of the jet 28 of ink drops, which may be referred to as the z axis. It will be appreciated that the available printing section of the wire is of limited extent. For example, insulated wires, of 0.045 inches and larger may be effectively printed using the method and apparatus of the present embodiment, even though the effective printing section or width may be as little as 0.04 to 0.05 inches. This dimension represents the effective width or transverse dimension of the three-dimensional workpiece surface as viewed from the printing head assembly 16 along the z axis. Within this limited width, the jet 28 of ink drops is selectively deflected to write out or form the alpha-numeric characters and thus, the effectiveness of guide block 63 in positioning the wire in the y axis dimension is important.

For this reason, the method and apparatus of the present embodiment provides a multiplicity of variously sized or gauged guide blocks 63, and quick change mounting means to facilitate the interchange of the guide blocks in order to accommodate different sizes of wires. The gauged blocks, one of which is shown as guide block 63 here, provide for a gradation of diameters of the discharge of exit guide opening, corresponding to guide opening 66 for guide block 63. The interchangeability of the guide blocks is here provided by the following means. A boss portion 71, having a rectangular cross section, protrudes from a lower wall 72 of guide block 63, and is elongate in the direction of the x axis. A complementary recess 73 is provided in a movable carriage 74 for detachably receiving and locking guide block 63 in position by suitable fastener means, such as here provided by screws 76. Accordingly, each of the multiple guide blocks is interchangeable with guide block 63, by loosening screws 76, removing the block and substituting a different guide block having a selected wire guide opening, corresponding to opening 66. Before securing the block in place, it is slidably positioned along the x axis, to locate exit end 67 of opening 66 just slight upsteam from the interception of jet 28 with the wire.

Furthermore, means are provided for movably adjusting the guide block along the y axis to facilitate the proper positioning the wire in registration with the ink jet. Here, the adjustment means is provided in the form of carriage 74 movable on ways 77 forming guide surfaces extending parallel to the y axis on a support 78 fixedly mounted to panel 44. A lead screw and follower assembly indicated at 79 coacts with carriage 74 and support 78 to provide a manually operable adjustment of the position of carriage 74 and thus block 63 along the y axis. Once properly positioned, carriage 74 may be locked in place by a manually operable locking lever 81 carried by support 78. In this particular embodiment, a precision jeweler's vise having the relatively movable carriage 74 and support 78 is employed.

After exiting from opening 66 of guide block 63 and advancing past printing station 14, the wire may be fed into a further guide 82, here of a tubular configuration similar to guide 48 and being supported from panel 44 by a braccket 83. A flared entry end 84 of guide 82 serves to capture and self-guide the workpiece into an inner, here elongate, guide opening 86, while a discharge or exit end 87 as diagrammatically shown in FIG. 1, discharges wire 11 into the automatic coiling pan 29 as shown in FIG. 1. Flared end 84 and opening 86 are dimensioned to provide substantial clearance from the exterior, newly printed wire surface to avoid smearing it just after it leaves the printing station 14 and before the ink has had an opportunity to dry.

As described more fully herein, printing head assembly 16 provides for selectively deflecting the jet 28 of ink drops so that they may be individually, selectively deposited onto wire 11 at different points, transverse to the wire length and thus along the y axis. In other words, the selective deflection of the drops of ink scans across the width of the wire in the direction of the y axis to provide one of the writing axes for forming the alpha-numeric characters. The other writing axis is formed along the x axis by the continuous, longitudinal advancement of wire 11 by transport 12 in synchronism with the selective deflection of the ink jet. In this manner, the jet of ink drops may be deflected to impinge upon the exterior, three-dimensional wire surface in predetermined alpha-numeric or other indicia forming patterns. Because each of the ink drops is individually guided in flight, irregularities in the exterior surface of the wire do not significantly detract from the printing operation as evidenced by the readability of the alpha-numeric characters on the convolutions of the twisted pair 23.

Although ink jet printing head assembly 16 may be constructed in accordance with any one of a number of devices known per se, the components of the presently disclosed assembly are commercially available from a model 9000 ink jet printer sold by the A.B. Dick Company of Elk Grove Village, IL. These components briefly include an ink jet nozzle assembly 91, a charging tunnel 92, oppositely poled deflection plates 93 and 94, ink supply line 96, ink pressure regulator 97 and ink supply connecting line 98. The construction and operation of this type of printer and other similar printers are disclosed in an article by Fred J. Kamphoefner, entitled "INK JET PRINTING" appearing in IEEE Transactions on *Electron Deivces*, April 1972.

In the embodiment of the invention disclosed herein, an ink jet printing apparatus is employed in which the ink jet is formed of a series of selectively, electrostatically charged ink drops ejected with substantial velocity from a printing head nozzle. The charged drops are electrostatically deflected, by amounts that depend on the received charge, in response to a constant deflection voltage applied across a pair of deflection plates.

Preferably in accordance with the method and apparatus of the present invention, these printer components, which are known per se, are remounted on a carriage means disposed for adjustable movement parallel to the z axis. More particularly, the carriage means is here provided by a substantially flat rectangular support member 101 slidably mounted in vertically extending guides 102 and 103 fastened to panel 44 adjacent printing station 14. An elongate adjustment screw 104 having an upper, manually operable adjustment knob 106 and being threadedly received in an internally threaded bore 107 of a bracket 108 fastened to panel 44 serves as the means for adjustably displacing the member 101 along the z axis by a connection of a lower end 109 of screw 104 to a journal block 111 affixed at the upper end of member 101.

This z axis adjustment for printing head assembly 16 provides for changing the width of the ink drop scan, i.e., the maximum deflection of the ink drops along the y axis at the point of interception of the ink drops with the wire, to dimension the size of the alpha-numeric characters along this axis to match the particular transverse dimension or diameter of the processed wire. That is, for relatively small diameter wires, the printing head assembly 16 is adjusted along the z axis to a position relatively proximate to the wire guide path, limiting the deflection of the ink drops, along the y axis, to slightly less than the effective printing width of the exterior wire surface.

As more fully explained herein, certain of the drops of ink within the ink jet are not deflected onto the surface of the wire. These drops follow a trajectory which is intercepted by a mouth 112 of a contoured, tubular ink sump 113 to which a vacuum or sub-atmospheric suction is applied at an end 114 remote from mouth 112. The undeflected drops of ink are captured in mouth 112 of sump 113, sometimes referred to as a "cobra" and returned to an ink reservoir under the influence of the suction. Tubular sump 113 is positioned with mouth 112 lying between wire 11 and deflection plates 93 and 94 and is formed with a contoured L-shaped bend at 116 which extends downwardly and rearwardly from mouth 112, initially parallel to the z axis and bending so as to extend away from the wire guide path generally rearwardly in the direction of the y axis. Since the jet 28 of ink drops is positioned in close proximity to the exit end of guide opening 66 of block 63 and because sump 113 must be positioned to intercept the nondeflected ink drops in the y–z plane, it is desirable to cut away or contour the exterior wall portion 117 of guide block 63 adjacent the exit end 67 so as to accommodate the positioning of sump 113. The mouth 112 may be adjustably positioned and then locked in place by an adjustable mounting assembly 118 including an elongate mounting member 119 pivotally mounted adjacent an upper end 121 to a flange support 122 carried by panel 44 and having an arcuate adjustment slot 123 coacting with a locking screw 124 for pivotally moving cylindrical mounting block 126 carrying the tubular sump 113 therewith and being movable in an arc about the pivoted end 121 of member 118. This permits adjustment of the y axis position of sump mouth 112. Support block 126 carrying sump 113 is also adjustable by loosening an eccentric mounting screw 127 and rotating block 126 thereabout to pivot the mouth 112 of the sump in a limited arcuate path generally along the z axis. Thus, the sump mouth 112 may be precisely adjusted within the y–z plane to intercept only those ink drops which remain undeflected and are not intended to impinge upon the exterior surface of the wire 11.

A relatively high voltage is applied across the deflection plates 93 and 94. To insure the proper functioning of the deflection system and to protect the voltage supply for the plates, means have been provided in control unit 57 to shut down the printing operation in the event plate 93 is shorted by a low impedance, resistive or capacitor path to ground. In the operation of assembly 16 in the present environment, it has been found that plate 93 may be occassionally shorted by a flailing severed end of wire 11 as it is withdrawn from guide block 63, and accordingly, plate 93 is preferably coated with a layer 115 of electrically insulating material.

The operation of the ink jet printing head 16 in general is fully described in the aforementioned IEEE article by Fred J. Kamphoefner. Briefly, ink under fluid pressure is introduced through supply 96, regulator 97 and connecting line 98 into a nozzle assembly 91. The nozzle assembly 91 includes an ink jet nozzle (not shown) which directs an unstable stream or jet of ink along the z axis toward wire 11. This unstable stream or jet of ink is intentionally and uniformly broken up into a series of uniform drops of ink by an electro-mechanical transducer, such as a piezoelectric crystal, operated by a relatively high a-c frequency to produce a pulsating fluid pressure effect adjacent the discharge nozzle. Thus, as the ink leaves the nozzle assembly 91, it is separated into a series of ink drops. Each of these drops are selectively charged by a controlled, variable voltage charging signal applied between nozzle assembly 91 and a charging tunnel 92. The selectively charged ink drops pass on through charging tunnel 92 and follow a trajectory between a pair of spaced apart, substantially parallel deflection plates 93 and 94, across which a predetermined, relatively large, constant deflection voltage is applied. The combination of the charged ink drops and the electric field between the deflection plates 93 and 94 results in a selective deflection of the numerous ink drops in a direction corresponding to the electric field. Here, plates 93 and 94 are oriented to establish the deflection field parallel to the y axis such that the ink drops, when they reach wire 11, are selectively positioned along the y axis in accordance with the amount of charge applied at charging tunnel 92. By applying a variable control signal to charging tunnel 92, it will be appreciated that the drops of ink may be deflected to impinge upon any desired point on the exterior surface of wire 11 along the y axis for a given x axis position of the wire. In operation, the travel of the wire 11 along the x axis is substantially slower than the deflection speed of the printing head so that a substantially straight, transverse link of ink drops may be applied to the exterior, three-dimensional surface of the wire, even though the wire is continuously longitudinally advancing past printing station 14.

The manner in which ink jet printing head assembly 16 is controlled in synchronism with the travel of the wire 11 is more fully explained herein, however briefly the presently disclosed embodiment of the invention provides a 7 × 5 ink dot printing matrix for forming each alpha-numeric character or other symbol. The y axis deflection of the ink drops provides one dimension of the matrix, and here seven discrete points (or dots) may be marked across the width of the exterior three-dimensional surface of the wire, while the x axis longitudinal advancement of the wire in synchronism with the printing head assembly 16 provides the other matrix dimension. In this case five longitudinal ink dot locations are afforded for each y axis dot position. As illustrated in FIG. 2, the alpha-numeric characters are printed onto the wire so that a multi-character code can be read from left to right along the wire length. In other words, the letters and numbers are here oriented transversely to the wire length, with the height of each character extending along the y axis, and the width of each character extending longitudinally of the wire along this x axis.

Although any suitable indicia may be printed onto the processed wire, an example of a useful multi-character code is as follows: W1041-243-22.

The first five characters preceded by the letter W identify the bundle or harness within which the wire is found; the next three characters indentify the particular wire within such harness or bundle; and the last two digits represent the wire gauge or size, namely a size 22 AWG. Thus, in FIG. 2, the twisted pair of wires 23 are found in harness or bundle W1041, and are identified as wires 243 and 244, both of which are a size or gauge AWG 22.

Figure 5:
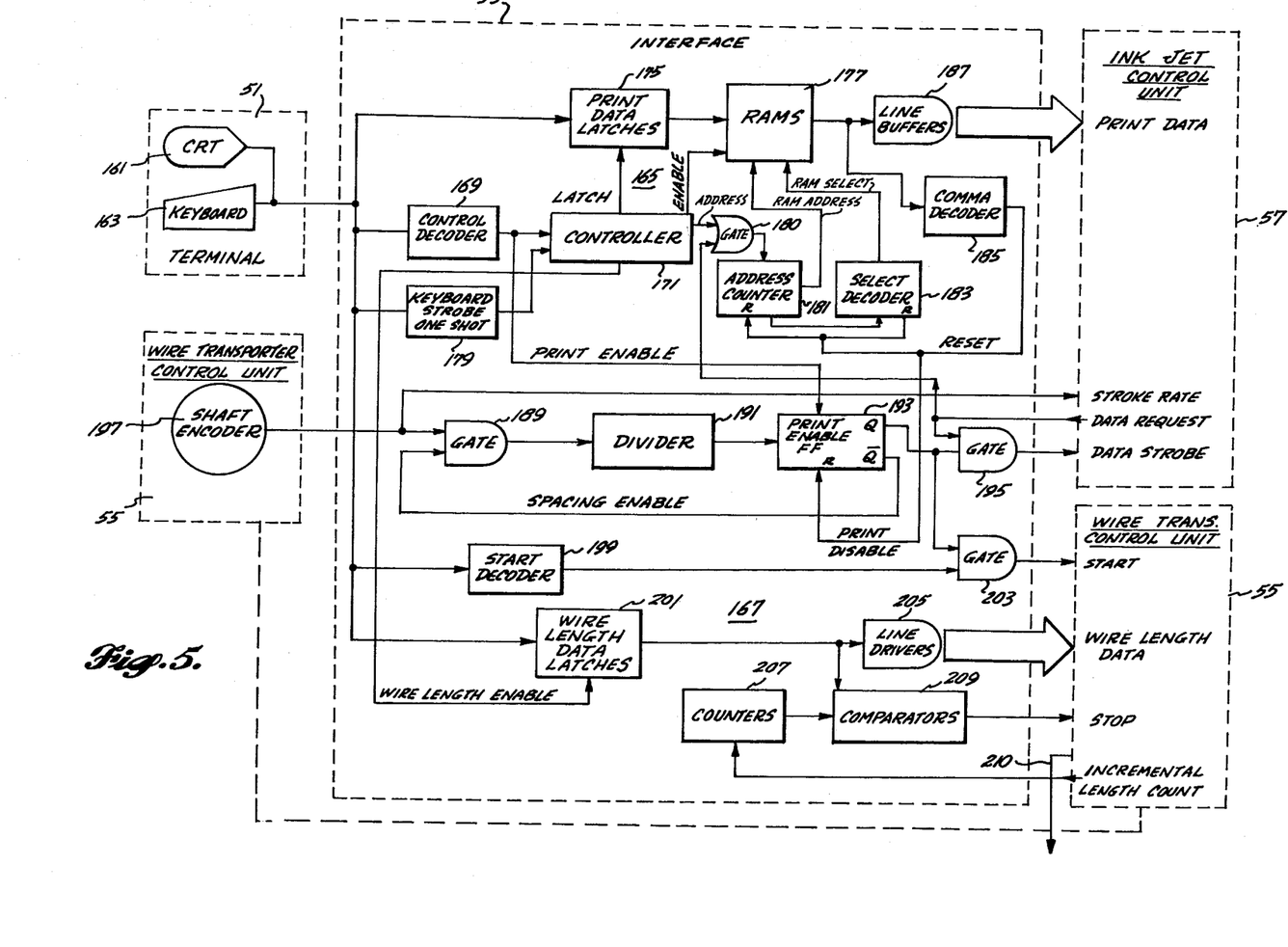
FIG. 5 is a detailed block diagram of the control system generally depicted in FIG. 1 for operating the ink jet printing head assembly, wire cut-off device and wire transport components.

FIG. 5 is a block diagram illustrating a control system for controlling the ink jet printer of the invention and includes a data input terminal 51; interface circuitry 53; a wire transport control unit 55 (illustrated as two blocks joined by a dashed line); and, an ink jet printer control unit 57. As noted above, the ink jet printer 16 is a commercially available Model 9000 ink jet printer sold by A.B. Dick Company, and includes a control unit 57 capable of receiving digitally encoded alphanumeric character information and synchronizing signals to form predetermined character patterns.

The data terminal 51 includes a cathode-ray tube (CRT) 161; and, a keyboard 163. In a conventional manner, the keyboard is utilized to generate control information. More specifically, as each key of the keyboard is depressed, a digital code identifying the alphanumeric nature of the depressed key, is generated. The code is interpretated by the electronic system associated with the CRT and creates the related alphanumeric visual display on the face of the CRT 161. The same code is received by the interface circuitry 53 which decodes it and utilizes it in the herein described manner. Preferably, the code is an ASCII code.

Alternatively, the data may be introduced into interface circuitry by any of several well known means, including manually controlled switches, punch cards, tape, programmed computer, etc. Similarly, the visual display may be provided by any suitable means such as LED's, liquid crystal displays, etc.

The interface circuitry 53 generally includes two electronic subsections: print electronics 165; and, wire length electronics 167.

The print electronics include: a control decoder 169; a controller 171; print data latches 175; random access memories (RAMs) 177; a keyboard strobe one-shot 179; a negative OR gate 180; an address counter 181; a select decoder 183; a comma decoder 185; line buffers 187; a first gate 189; a divider 191; a print enable flipflop 193; and a second gate 195.

The digital coded data output of the keyboard 163 of the data terminal 51 is applied to: the input of print data latches 175; the input of the control decoder 169; and the input of the keyboard strobe one-shot 179. The data output of the print data latches 175 are connected to the data input of the RAMs 177. While various numbers of RAMs can be included in an actual embodiment of the invention, six RAM pairs have been found adequate for most uses. The data outputs of the RAMs are connected to the line buffers 187. The data outputs of the RAMs are also connected to the input of the common decoder 185.

A print enable output of the control decoder 169 is connected to an enable input of the controller 171. The output of the keyboard strobe one-shot 179 is connected to a data input of the controller 171. The controller generates a sequential series of control outputs, designated LATCH, ENABLE and ADDRESS, for use in manner hereinafter described. The LATCH output is connected to the latch control input of the print data latches 175; the ENABLE output is connected to the enable input of the RAMs 177; and, the ADDRESS output is connected through gate 180 to the count up input of the address counter 181. The address counter 181 sequentially generates RAM address codes, which are applied to the RAMs 177 along the line designated RAM ADDRESS. After the address counter has gone through an entire cycle of operation, i.e., generated all of its addresses once, it generates a pulse, which is applied to the select decoder 183. The select decoder 183 in turn, generates RAM select codes, which are applied to the RAMs along the line designated RAM SELECT. The RAM SELECT codes select which of the six RAM pairs is to receive a particular RAM address code. The comma decoder 185 generates a reset pulse, which is applied to the address counter and select decoder along a line designated RESET. The occurance of this pulse resets these devices to initial RAM address and select states.

The wire transporter control unit 55 includes a shaft encoder 197, which generates output pulses as wire is moved through the transporter. By way of example, 6 inches of wire may be transported for each revolution of the shaft encoder and 500 pulses may be produced per revolution.

The output of the shaft encoder 197 is applied to one input of the first gate 189. This same output creates a STROKE RATE pulse chain that is applied to the stroke rate input of the ink jet printer control unit 57.

The output of the first gate 189 is connected to the count input of the divider 191. The divider 191 divides down the output of the first gate by any suitable number. For example, the divider may be formed of a divide-by-10 divider followed by a divide-by-8 divider whereby the output of the divider is generally equivalent to one pulse for each inch of linear wire movement. The output of the divider 191 is applied to the data input of the print enable flipflop 193. The print enable output of the control decoder 169 is applied to the set input of the print enable decoder 193 and the output of the comma decoder 185 is applied to the reset input of the print enable flipflop 193.

The Q output of the print enable flipflop is connected to one input of the second gate 195. The $\overline{Q}$ output, defined as a SPACING ENABLE signal, is applied to the second input of the first gate 189. DATA REQUEST pulses generated by the ink jet printer control unit are applied to the second input of the second gate 195 and to the count up input of the address counter 181 through a negative OR gate 180 gated with the ADDRESS signal from controller 171.

As will be better understood from the following description of the operation of the electronic control system illustrated in FIG. 2, the print electronics 165 receives the output of the data terminal 51 and, in accordance therewith, control the nature of the alphanumeric characters to be printed. The print control data is stored in the RAMs 177 and outpulses via the line buffers 187 as PRINT DATA signals suitable for controlling the ink jet printer control unit 57. During printing, the STROKE RATE pulses control the rate of reading PRINT DATA and the rate of printing. The DATA REQUEST pulses, which provide an indication of when the printer is ready to receive data, control the address and select counters; and, the DATA STROBE pulses control the application (not rate) of PRINT DATA. The generation and application of the stroke rate pulses in this manner serve as a means of synchronizing the printing rate with the speed or velocity of the wire. Although in general, either the wire speed or the printing rate may be the independent variable and the other dependent thereon in a synchronized manner, preferably and in the present embodiment, the wire speed, determined by transport 12 is the independent variable. Because of the inertia involved in accelerating the wire up to a predetermined running speed, and thereafter decelerating such wire, it is not practical to change the wire speed as rapidly as changing the deflection rate of the ink jet printer, thus the latter is preferably synchronized to and dependent on the speed of the wire as monitored by control unit 55 so that the printing rate tracks the acceleration and deceleration of the wire velocity.

The wire length electronics 167 include: a start decoder 199; wire length data latches 201; a third gate 203; line drivers 205; counters 207; and, comparators 209. The digital coded data ouput of the data terminal 51 is applied to the input of the start decoder 199 and to the input of the wire length data latches 201. The wire length data latches 201 are enabled by a wire length enable output of the controller 171.

The output of the start decoder is applied to one input of the third gate 203. The Q output of the print enable flipflop 193 is applied to the second input of the third gate. The output of the third gate 203 is a START signal commanding control unit 55 to start the wire transporter 12.

The outputs of the wire length latches 201 are connected to the inputs of the line drivers 205 and the outputs of the line drivers 205 form WIRE LENGTH DATA signals which may be utilized by control unit 55 to display the total length of wire that is to be processed.

The output of each of the wire length data latches 201 is also applied to one input of the comparators 209. The counters 207 receive increment length count pulses from the wire transporter control unit 55. Each counter output is applied to the remaining input of a corresponding comparator. When coincidence between the pulse count and the output of the wire data latches occurs, the comparators 209 apply a STOP signal to the wire transporter control unit, stopping the transport 12. Simultaneously the transport 12 issues a signal over line 210 to cutoff device 27 causing the wire to be cut Turning now to a description of the operation of the control system illustrated in FIG. 5; assuming initially that the wire transporter is stopped and no data is contained in the RAMs (or previously entered data is stored therein, but its operational use has terminated), the operator first depresses a key indicating that wire code data is to be inserted. A # sign key may be used for this purpose, for example. The control decoder 169 decodes that this key has been depressed and applies an enable signal to the controller 171. The # sign is blocked by the controller 171 from advancing the address counter 181. The next key code defines the first alpha-numeric character of the wire code. The keyboard strobe one-shot, which is adpated to generate a pulse any time any key is depressed, generates a pulse. In accordance with the receipt of this pulse, the now enabled controller 171 generates a LATCH signal to enable the print latches 175 to "read" the code generated by the depressed key.

The depression of the first character key also causes the keyboard strobe one-shot to apply a second pulse to the controller 171. The second pulse enables the input to the RAMs 177. This allows the RAM selected by the RAM SELECT signal to read and store, at the address defined by the RAM ADDRESS signal, the data output of the print data latches. The depression of the first character key also causes the keyboard strobe one-shot to apply a third pulse to the controller. The third pulse generates a RAM ADDRESS signal to change to a new memory address. Depression of the second alpha-numeric character code key causes a repeat sequence, plus the RAM ADDRESS signal to change to a new address. This sequence continues until the entire alpha-numeric character code is stored in the RAMs. When a particular RAM pair is full, the address counter 181 applies a pulse to the select decoder 183 causing a new RAM pair to be selected. After the wire code data (alpha-numeric character code) has been completed, a suitable character key, such as a comma (,) for example, is depressed, and its code is also stored.

Next, a key creating a control code designated to allow keyboard entry of wire length information data is depressed; an asterisk (*) key for example. This control code is recognized by the control code decoder 169 and causes the controller 171 to apply a WIRE LENGTH ENABLE signal to the wire length data latches 201. The wire length data latches are now enabled to receive and store information relating to the length of the wire to be printed. This information is created by the depression of suitable keyboard keys. The wire length data latches apply their stored information to the comparators 209 and, via the line drivers, to the wire transporter control unit 55.

The occurrence of a subsequent code, such as a carriage return code disables the controller via the control decoder. This same control code sets the print enable flipflop 193.

In the foregoing manner, both print and wire length data are stored in the interface and made available to the ink jet printer and the wire transporter.

To summarize, the keyboard strobe one-shot starts a timing chain that opens the print data latches 175 via the controller 171 to cause them to accept new data. The first one-shot pulse passes and the data latches remain locked into the data accepted. A second one-shot pulse clocks data from the data latches into the appropriately selected and addressed RAM. The third one-shot advances the address counter 181 to a higher memory address whereby the RAM is advanced to a higher memory cell location. When the address counter has counted through a suitable number of cells, such as 16 memory cells, it generates a carry-over signal to the select decoder 183 which causes it to advance to the next RAM pair in sequence from the first RAM pair to the sixth RAM pair. In this manner, up to 95 characters can be stored, one memory cell location being used to store the comma code. At the end of the generation of wire code data, the return code is generated and recognized by the control code decoder 169. The return code disables the controller 171 and enables the print enable flipflop 193 in preparation for printing. Thereafter, any movement of the wire will start the printing operation.

Turning now to a description of the printing operation, printing is started by the start decoder 199 recognizing a suitable code. For example, a dollar sign ($) code can be used to start printing. (Or a manual switch, not shown, could be used to start printing.) When the start code is recognized, the start decoder generates an output that, in combination with the set state of the print enable flipflop, as sensed by the third gate 203, causes a start signal to be applied to the wire transporter control unit 55.

As the transporter begins to move wire, the shaft encoder generates stroke pulses causing the ink jet printer to read the first character and print it onto the wire. Upon completion of first character printing, a data request pulse is generated by the ink jet printer. The data request pulse causes the address output of the address counter to change and a second data strobe pulse to be generated. This sequence continues until the entire alpha-numeric character code is read. The ink jet printer, in accordance with its normal mode of operation, uses this alpha-numeric character code data to cause alpha-numeric characters to be printed onto the wire.

Preferably, each wire code alpha-numeric sequence is separated by a suitable space, such as 1 inch, for example. This space is controlled by the comma decoder 185. More specifically, the comma control code is stored at a RAM address along with the wire code alpha-numeric sequence. At the end of each wire code printing sequence, the comma code is detected by the comma decoder 185. When this event occurs, the comma decoder resets the address and select counters and the print enable flipflop 193.

When the comma decoder 185 resets the print enable flipflop 193, $\bar{Q}$ is applied to the first gate 189, causing it to open and pass pulses from the shaft encoder to the divider 191. The divider counts a suitable number of pulses, representative of a data signal to the print enable flipflop 193 causing it to be set. This process is repeated for the total length of wire. During the period of time the print enable flipflop is reset, the second gate is inhibited and DATA STROBE pulses prevented from occurring. Thus, printing is prevented for 1 inch spacing intervals. Since the DATA STROBE pulses cannot occur, DATA REQUEST pulses cannot occur. Thus, no address changes occur during this period of time.

While only a limited number of embodiments of the present invention have been disclosed herein, it will be readily apparent to persons skilled in the art that numerous changes and modifications may be made thereto without departing from the spirit of the invention.

For example, while the herein disclosed embodiment provides for transporting the wire past a stationary printing assembly 16, an alternative arrangement may provide for moving the ink jet assembly along a stationary wire, inasmuch as it is the relative movement therebetween that is necessary.

Also, the ink jet printing of wires in accordance with the present invention may be employed in environments other than for marking wire received from storage or supply reels. For example, the means for advancing or forwarding the wire past the ink jet printing station may be a component or components of a wire forming and/or insulating operation in which the printing is applied by the ink jet printer as the wire emerges from the forming and/or insulating mechanisms. Such mechanisms may for example take the form of extruders for extruding the wire conductor and/or extruding a dielectric sheath for insulating the conductor.

Accordingly, the foregoing disclosure and description thereof are for illustrative purposes only and do not in any way limit the invention which is defined only by the following claims.

I claim:

1. In an apparatus for marking multi-character, alpha-numeric, identification codes on a substantially continuous length of electrical wire or the like having a three-dimensional exterior surface, and including means for advancing said wire lengthwise past a printing station, the improvement comprising:
   ink jet printing means disposed at said printing station for directing a selectively and electrostatically deflectable jet of droplets of printing ink to impinge and be deposited on the exterior surface of the advancing wire, said printing means being so arranged relative to the wire and being so responsive to the rate of longitudinal advancement of the wire as to cause said droplets of said printing ink to be deposited on the exterior surface of said wire in the form of alpha-numeric characters.

2. The apparatus set forth in claim 1, wherein said printing means includes deflection means for selectively deflecting said droplets of printing ink in a plane substantially transverse to the length of said wire, and the apparatus further comprising control means operatively connected between said means for advancing said wire and said printing means, and control means synchronizing the selective deflection of said droplets of printing ink with the advancement rate of said wire past said printing station so that said alpha-numeric characters are formed by the combination of the selective deflection of said droplets and said advancement rate of said wire.

3. The apparatus set forth in claim 2, wherein said wire includes at least two individually insulated elongate electrical conductors and said exterior surface of said wire is defined by an aggregate of the exteriors of said insulated conductors, and said deflecting means selectively deflecting said droplets so that they are deposited in the form of said characters on the aggregate of the exteriors of said insulated conductors.

4. The apparatus set forth in claim 2, wherein said control means includes means for sensing the rate of said advancement of said wire and means for operating said deflection means so as to cause said droplets of said printing ink to be deflected periodically at intervals dependent on said rate of said advancement.

5. The apparatus set forth in claim 2, wherein said printing means has a printing head assembly that includes said deflection means and wherein the improvement further comprises:
   head assembly carriage means adjustably mounted for movement along a first axis transverse to the direction of said advancement of said wire, said head assembly mounted on said head assembly carriage means for providing an adjustment of the distance along said first axis between said deflection means and said wire so that the magnitude of deflection of said droplets of printing ink at their interception with said surface of said wire is adjustable.

6. The apparatus set forth in claim 5, wherein the improvement further comprises:
   a wire guide block means having a wire guide opening therethrough that terminates at an exit at which said wire emerges to expose said exterior surface to said droplets of printing ink, said guide opening at said exit being sized relative to said wire to precisely guide said wire in a predetermined guide path past said printing station, guide block carriage means adjustably mounted at said printing station for movement along a second axis transverse to said guide path and transverse to said first axis, said guide block means being disposed on said guide block carriage means so that said wire guide opening that determines said guide path can be positioned along said second axis for centering the circumference of the exterior surface of said wire relative to said jet of droplets of printing ink.

7. The apparatus set forth in claim 6, wherein said guide block carriage means includes a guide block support means, and said guide block means being detachably mounted on said guide block support means, whereby a plurality of similar guide block means having differently calibrated wire guide openings can be selectively mounted on said guide block support means to accommodate different sized wires.

8. In a method of marking multi-character, alpha-numeric, identification codes on the three-dimensional exterior surface of a substantially continuous length of electrical wire including the step of advancing such wire lengthwise past a printing station, the improvement comprising:
  guiding said wire in a predetermined guide path as it is advanced past the printing station;
  directing a jet of droplets of electrostatically chargeable printing ink transversely toward said guide path at said printing station; and
  selectively and electrostatically deflecting said droplets of ink so that they impinge on said surface of said wire in the form of alpha-numeric characters.

9. The method set forth in claim 8, wherein said jet of droplets of ink is deflected in a plane that extends substantially transversely to said guide path, and further comprising the step of timing the deflection of said droplets of ink with the velocity of lengthwise advancement of said wire so that said alpha-numeric characters are formed by a combination of said steps of selectively deflecting said jet of droplets of ink and of advancing said wire.

10. The method of claim 9, wherein said wire has an irregular exterior surface.

11. The method of claim 10, wherein said wire comprises multiple conductors in which at least certain of said conductors are individually insulated and wherein said irregular exterior surface is defined by an aggregate of the exteriors of said conductors, and said step of selectively deflecting said jet of droplets of ink cause said alpha-numeric characters to be deposited on the aggregate of the exteriors of said conductors of said wire.

12. The method set forth in claim 11, wherein said wire is twisted about its length such that said irregular exterior surface defined by the aggregate of the exteriors of said conductors is convoluted.

13. The method set forth in claim 10, wherein said wire has an outer sleeve that is braided and defines said irregular exterior surface.

14. The method set forth in claim 13, wherein said outer sleeve is a conductive electrical shield.

15. The method of claim 8, wherein said step of selectively deflecting comprises the sub-steps of selectively defelecting said jet of droplets of ink in a plane extending substantially transverse to the elongate dimension of said guide path and in accordance with a predetermined, timed sequence of selective amounts of deflections that in combination with the lengthwise advancement of the wire causes the formation of a predetermined sequence of alpha-numeric characters that constitute a predetermined multi-character code.

16. The method set forth in claim 15, further comprising the step of repeating said predetermined, timed sequence of deflections at successive longitudinally spaced intervals on said wire so that said predetermined sequence of alpha-numeric characters is repeated along said wire at said intervals.

17. A wire marking system, comprising:
  wire supply means for longitudinally dispensing a substantially continuous, elongate wire having a three-dimensional exterior surface;
  wire transport means mounted adjacent said supply means for longitudinally receiving and advancing said wire at a controlled rate;
  guide means for longitudinally receiving and longitudinally guiding said wire past a printing station;
  electronically controlled ink jet printing means disposed adjacent said printing station for directing an electrostatically deflectable jet of printing ink onto said wire to form alpha-numeric characters thereon; and
  control means connected between said transport means and said printing means for controlling the deflection of said jet of ink in accordance with said controlled rate of longitudinal advancement of said wire.

18. The wire marking system of claim 17, wherein said guide means comprises a wire guide block having a calibrated wire guide opening through which said wire is passed and guided in a constant guide path relative to said printing means, and a guide block carriage means for supporting said wire guide block and being movably mounted relative to said printing means for positioning said wire guide opening along an axis extending transverse to said guide path and transverse to the jet of printing ink so that said alpha-numeric characters can be centered on said wire's exterior surface.

19. The system set forth in claim 17, wherein said control means includes encoder means operatively associated with said transport means for producing an electrical signal representing predetermined longitudinal increments of travel imparted to said wire by said transport means, and said control means further including date input means for receiving electrical signal data representing a predetermined length of wire to be marked by said printing means, totalizer means connected to said encoder means and responsive to said electrical signal for totalizing the distance of wire advanced by said transport means past said printing station, circuit means having inputs connected to said date input means and to said totalizer means and having an output issuing a control signal in response to a comparison of signals at said inputs, and controllable wire cut-off means disposed between said transport means and said printing station and having a control input connected to said output of said cirucit means and being operative in response thereto to sever said wire at said predetermined length.

20. A wire marking system, comprising:
  wire supply means for longitudinally dispensing a continuous, elongate wire having a three dimensional exterior surface;
  wire transport means mounted adjacent said supply menas for longitudinally receiving and advancing said wire at a controlled rate;
  guide means for longitudinally receiving and longitudianally guiding said wire past a printing station;
  electronically controlled ink jet printing means disposed adjacent said printing station for directing an electrostatically deflectable jet of printing ink onto said wire for forming alpha-numeric characters thereon;

control means connected between said transport means and said printing means for controlling the deflection of said jet on ink in accordance with said controlled rate of longitudinal advancement of said wire;

said control means including encoder means operatively associated with said transport means for producing an electrical signal representing predetermined longitudinal increments of travel imparted to said wire by said transport means, data input means for receiving electrical signal data representing a predetermined length of wire to be marked by said printing means, totalizer means connected to said encoder means and responsive to said electrical signal for totalizing the distance of wire advanced by said transport means past said printing station, and circuit means having inputs connected to said data input means and to said totalizer means and having an output issuing a control signal in response to a comparison of signals at said inputs; and controllable wire cutoff means disposed between said transport means and said printing station and having a control input connected to said output of said circuit means and being operative in response thereto to sever said wire at said predetermined length.

* * * * *